July 9, 1957  J. G. A. JOHNSON  2,798,278
APPARATUS FOR TREATING CONCRETE
Filed Jan. 22, 1953  4 Sheets-Sheet 1
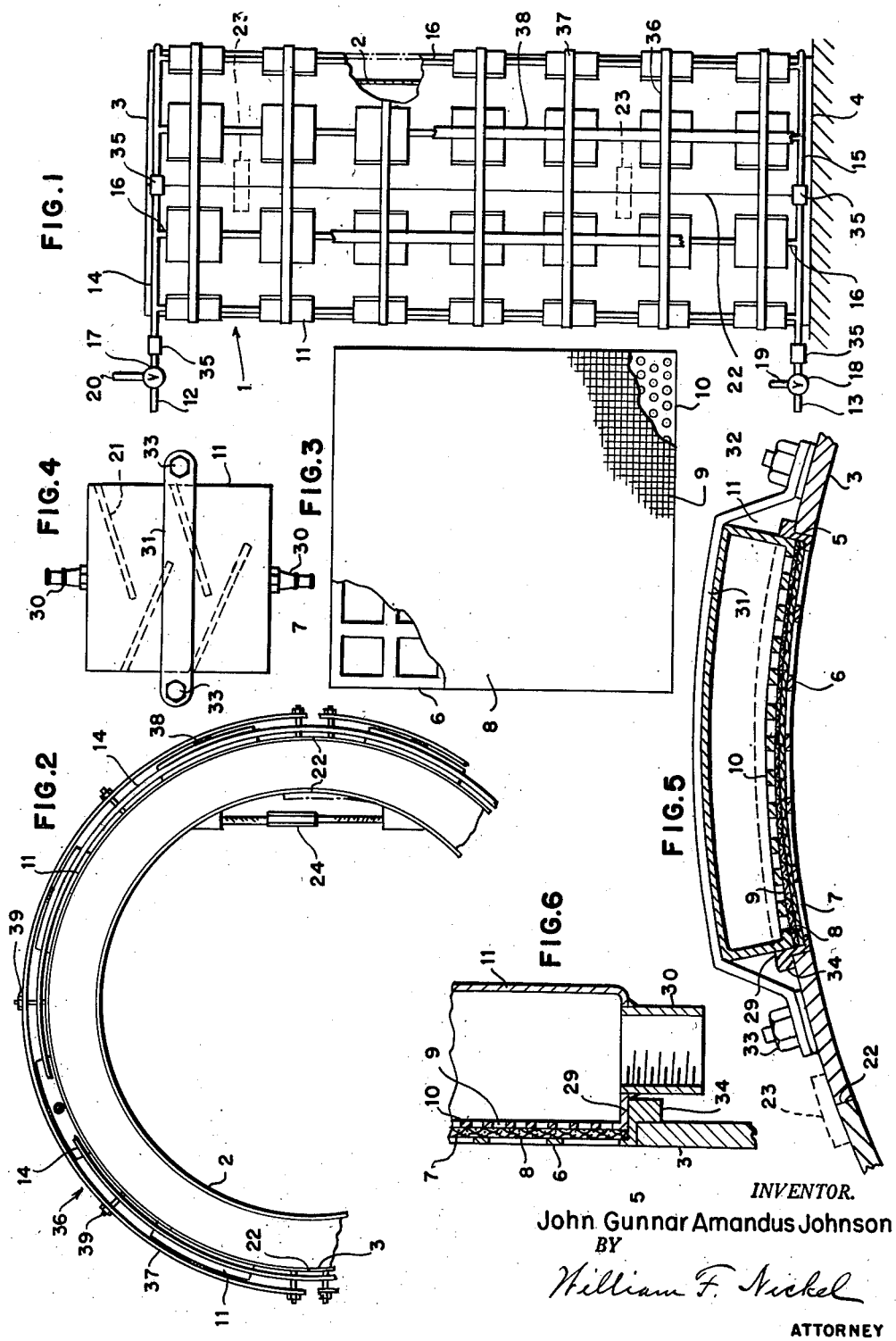
INVENTOR.
John Gunnar Amandus Johnson
BY
William F. Nickel
ATTORNEY

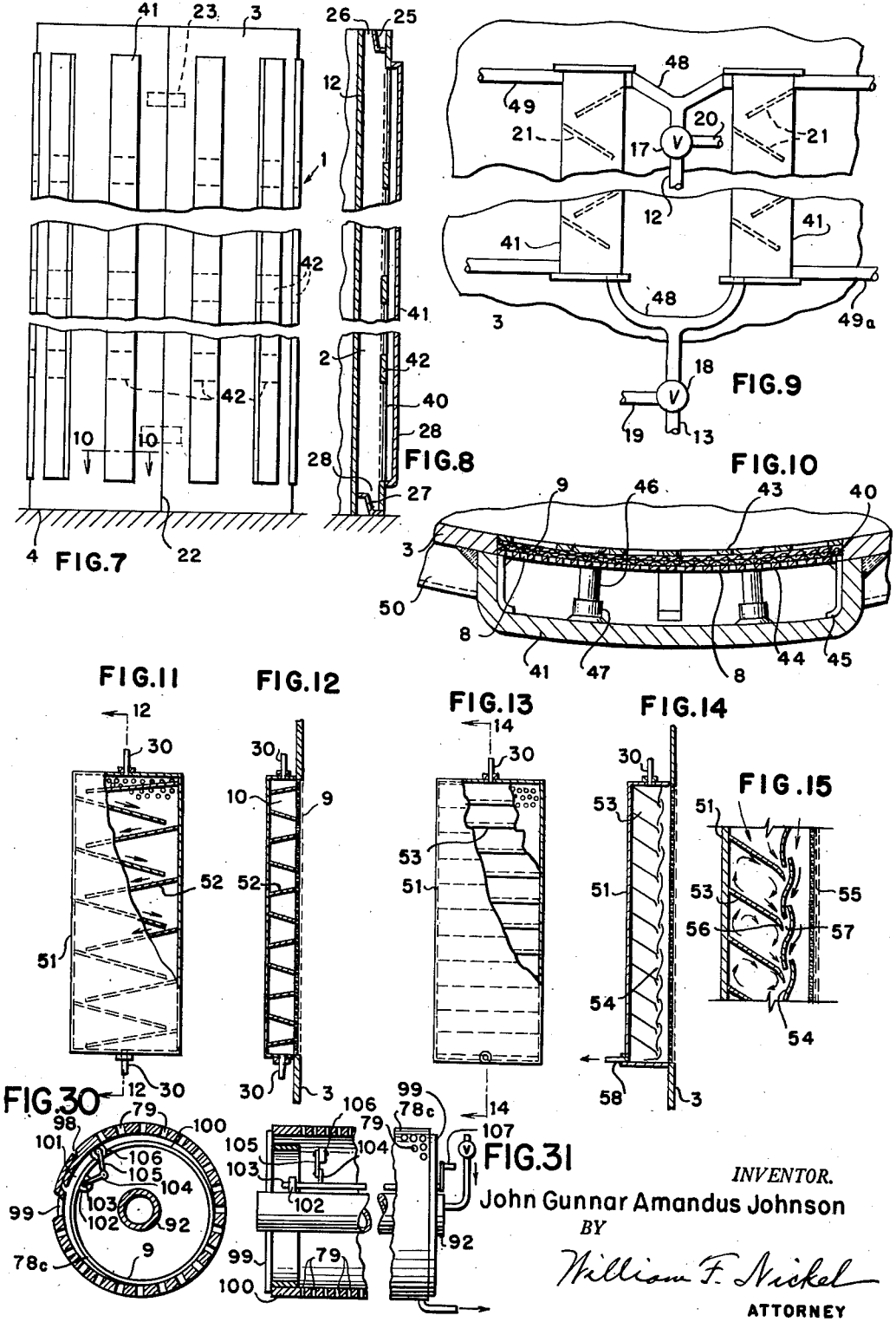

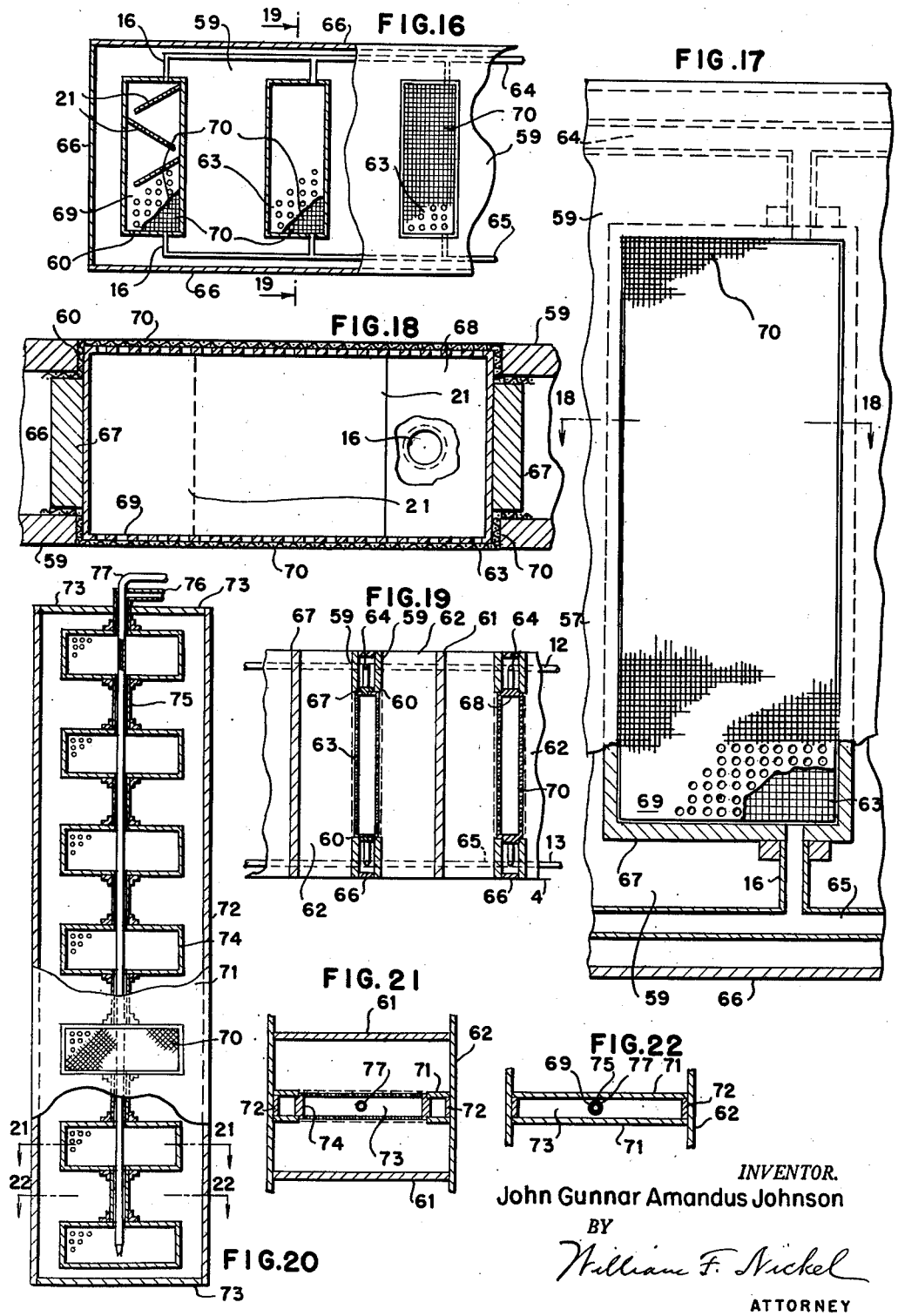

July 9, 1957  J. G. A. JOHNSON  2,798,278
APPARATUS FOR TREATING CONCRETE
Filed Jan. 22, 1953  4 Sheets-Sheet 4
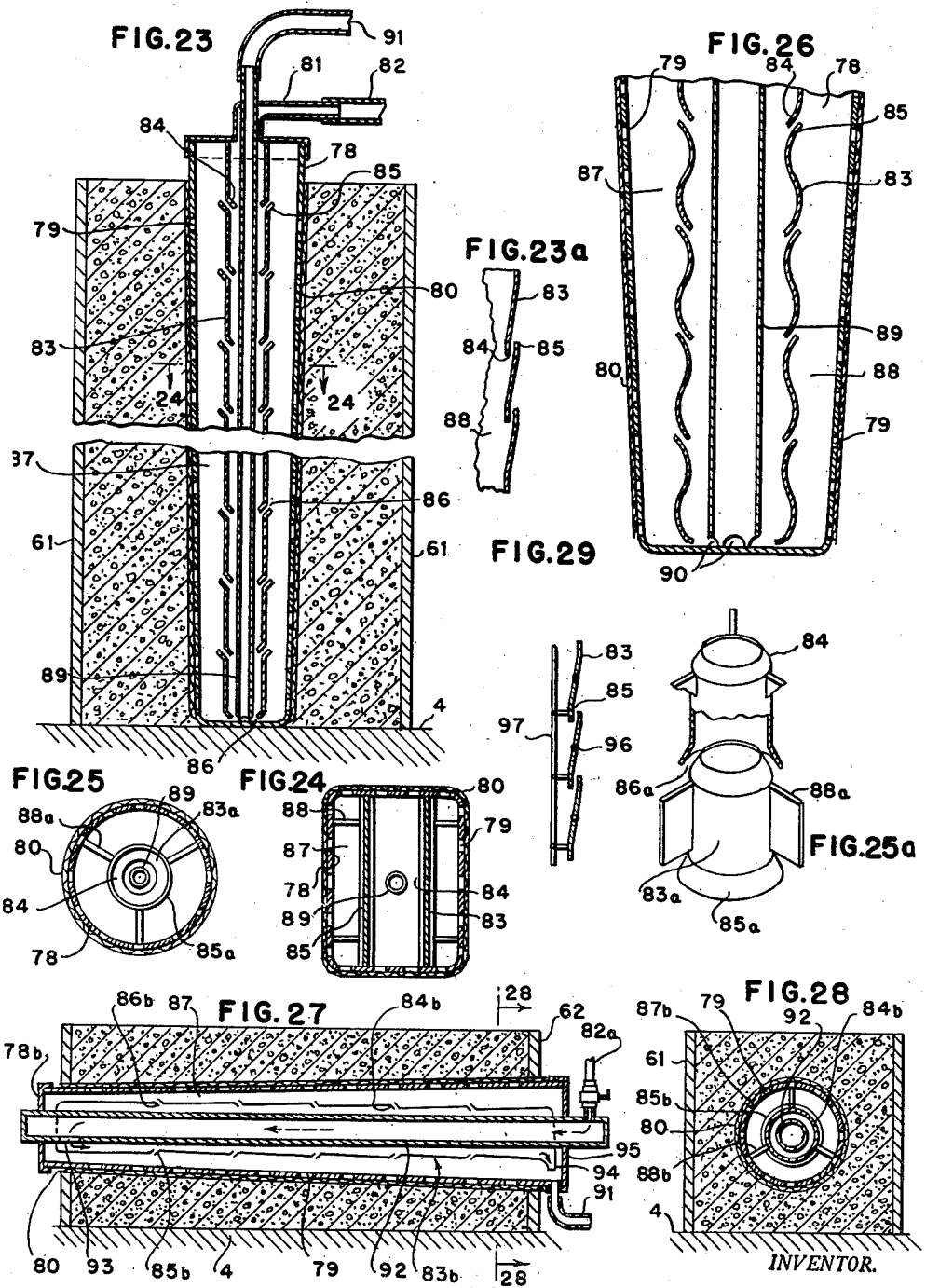
INVENTOR.
John Gunnar Amandus Johnson
BY
William F. Nickel
ATTORNEY _United States Patent Office_

2,798,278
Patented July 9, 1957

2,798,278
APPARATUS FOR TREATING CONCRETE
John Gunnar Amandus Johnson, New York, N. Y.

Application January 22, 1953, Serial No. 332,685

14 Claims. (Cl. 25—41)

This invention is an improved apparatus for treating cement and concrete; a especially wet cement and concrete deposited in molding devices having interior spaces of the desired size and shape to produce finished and hardened precast cement or concrete building and other units; and wet cement or concrete cast or otherwise formed for structural purposes at the place to use.

When concrete or cement is mixed with water to put it into a viscous or semi-liquid state, so that it can be poured or otherwise handled, a relatively small amount of water is required to complete the chemical reactions between the cement and water, but more than this amount must be used to soften the mass so that it can be poured, laid or placed. As the cement paste is thinned out with water, however, its quality is lowered; and when it sets it has less strength and becomes less resistant to the elements. Therefore when the mixture is placed in the mold forms or otherwise handled, as much as possible of the excess mixing water in the cement paste, that binds the sand and stone aggregates into a solid mass, should be removed before the hardening process begins. If ordinary drying and evaporation is relied upon for the absorption and extraction of the excess water a considerable time is required, and when the cement or concrete is in a mold cavity it must remain there till the setting and solidifying commence and are well advanced.

Also in the preliminary stage, the excess water as it evaporates from the wet plastic mass is apt to leave numerous minute voids in the cement or concrete, so that the density of the final product is reduced and its strength is decreased. Hence such voids also must be fully eliminated and closed, to render the concrete non-porous and solid throughout. The strength, watertightness and durability of hardened concrete or cement are in great degree dependent on its density.

Accordingly, the principal object of this invention is to provide an apparatus by which the wet concrete or cement can be dewatered and hardened in a relatively short time, and simultaneously be freed of internal voids, preferably by vibration without the use of mechanical accessories, so that the finished product is a uniformly compact monolithic mass with maximum density and strength. Another object is to save time, labor and expense; for with my improvements the concrete or cement, in molding operations, for instance, can be separated from the molding devices as soon as it attains a condition of sufficient stability, in which the cast unit will retain fully its form, and will not sag or flow at any point due to its own weight, even though it may still be somewhat moist and the initial setting process of the cement paste has not commenced.

The nature of the invention and other objects thereof and the practical advantages to be derived from its uses are made clear in the following description and the novel features are pointed out in the claims. The drawings illustrate several embodiments of the invention; but the disclosure is by way of example, numerous minor variations in the details of structure and steps of performance, not necessarily set forth herein, may be adopted without omitting or materially altering any of the essential characteristics by which the invention is distinguished.

On the drawings:

Figure 1 is a side elevation of a cylindrical mold form used for producing section of conduits of cement or concrete.

Figure 2 is a top plan thereof, in part.

Figure 3 shows in enlarged horizontal section a portion of said mold form, with water and air outlet casing attached.

Figure 4 is a front view of such a casing, seen from the outside.

Figure 5 is a similar elevation, enlarged, of the inner face of such a casing.

Figure 6 is a vertical section of a part of said casing.

Figure 7 is a side view of another mold form to produce sections of conduits.

Figure 8 is a developed view of part of the outside of said mold form.

Figure 9 is a vertical section thereof.

Figure 10 is an enlarged horizontal section of part of the form shown taken on line 10—10 in Figure 7.

Figure 11 is a front view of a preferred design of an outlet casing with air flow baffles therein, used in the practice of my invention.

Figure 12 is a vertical section thereof, on line 12—12 of Figure 11.

Figure 13 is a front view of another design of an outlet casing with air flow baffles and air suction devices therein.

Figure 14 is a vertical section thereof on line 14—14 of Figure 13.

Figure 15 is an enlarged sectional detail of air suction or ejecting device shown on Figure 14.

Figure 16 is a side view partly in section of a different mold structure with the long side horizontal.

Figure 17 is an enlarged side view, partly in section of one of the outlet casings of the last named structure.

Figure 18 is a horizontal section on an enlarged scale, along line 18—18 of Figure 17.

Figure 19 is a transverse vertical section on line 19—19 in Figure 16; with other parts of a molding device added.

Figure 20 is a side view partly in section of a further mold structure with the long side vertical.

Figure 21 is a transverse horizontal section on line 21—21 in Figure 20, with other parts of a molding device added.

Figure 22 is a transverse horizontal section on line 22—22 in Figure 20; with other parts of a molding device added.

Figure 23 is a sectional view of an implement to be imbedded in wet concrete, to serve the purposes of my invention.

Figure 24 is a cross section on line 24—24 in Figure 23.

Figure 25 is a similar section of an implement with a different cross-sectional shape.

Figure 25-a shows in perspective a detail of the last mentioned implement.

Figure 26 is a section on an enlarged scale of an implement like that of Figure 23, with a modified construction.

Figure 27 is a section of an implement to be utilized in the same way as the implement of Figure 23, but in a different position.

Figure 28 is a section on line 28—28 of Figure 27.

Figure 29 is a diagrammatic view of a detail of a further modification.

Figure 30 is a cross section; and

Figure 31 is a side view broken away of another implement according to my invention.

In Figures 1 to 6 inclusive, the numeral 1 indicates a cylindrical mold form with vertical inner wall 2 and vertical outer wall 3 between which is the mold cavity to be filled with wet cement or concrete. This is a well known device employed for producing molded or cast sections to be coupled end to end to make conduits or mains for the passage of water, and such sections are of various sizes; consider for example, a medium sized unit 30 inches in diameter and 8 feet in length. The form is mounted upright on a base 4, which usually has the shape of an annular pallet 4 and the cement or concrete is poured in at the top till the space between the walls 2 and 3 is entirely filled. Of course my invention is not limited to a cylindrical form, but a mold device of that shape will serve as an example.

Heretofore the walls 2 and 3 have been imperforate and continuous, and when the form is filled, the cement or concrete usually requires a full day to dry and harden. The mold forms are then removed. At this stage cement or concrete more or less hard will ordinarily adhere to the inside surfaces of the walls 2 and 3, which then can only be cleaned by scraping and brushing with tools. This method requires a long time and the final product is apt to contain numerous small voids and has less than maximum strength and density.

By my invention a cast concrete or cement unit or section can be produced in much shorter time than by conventional fabrication or construction methods and is considerably stronger and denser when finished. To this end I employ a mold form with openings 5 in the outer wall 3; and in each opening flush with the inner face of the wall 3 is a metal protection grid 6 with apertures 7 over its entire extent. Upon the outer face of the grid is a sheet of porous cloth 8, such as muslin, for instance, and on the cloth is a piece of wire mesh 9 of equal size and shape; that in its turn is covered by a perforated steel plate 10. The grid 6 and plate 10 with the cloth 8 and mesh 9 between them fill the openings 5. These members constitute filters, through which air and moisture can be drawn; and each filter is secured over the inner open face of a casing 11, which is otherwise closed and is made fast to the outside of the wall 3. The openings 5 and casings 11 are shown mounted on outer face of the wall 3 in suitable positions, such as horizontal and vertical rows, extending all around the form 1 and from top to bottom, and at the top of the mold form is an air inlet pipe 12 for controlled admissions of air, while at the bottom is an air suction and water outlet pipe 13. The inside wall may in the case of large pipe diameters and heavy wall thicknesses also be provided with similar filters and casings 11, on the inner face thereof.

The pipe 12 is connected to each casing 11 in the uppermost horizontal row by a header pipe 14 surrounding the mold form 1 and short pipes 16; and the pipe 13 to the lowermost horizontal row by a similar header pipe 15 and other short pipes 16. These header pipes or hose lines 14 and 15 can be ringshaped, and in two semi-circular sections if desired, coupled together; and to the pipes 12 and 13 respectively at their opposite ends. The remaining casings are all connected vertically to one another and to the top and bottom horizontal rows by more short pipes 16, each of which joins the bottom of one casing to the top of the casing directly above it. The lower pipe 13 is coupled to a suitable suction pump operated by a motor, not shown, as the pump and motor are not part of my invention. The pump in operation draws air and moisture out of the concrete or cement in the mold form 1 through the openings 5 and filter members in the casings 11 by creating a suction in the casings; the degree of suction being regulated by a controlled admission of air through the pipe 12 and other pipes at the top of the form 1. The filters prevent any of the wet cement or concrete from being extracted from the mass between the walls 2 and 3. While the casings are shown on the outside of the molding device, the openings 5 can also be located, if desired, in the inner wall 2 instead; as the casings 11 can be attached to this wall as well as to wall 3. The mode of operation with the pump running will be the same to dry out and solidify the contents of the mold. Instead of wire mesh 9 and perforated steel plate 10, a wire mesh heavy enough to withstand the pressure of the wet concrete or cement between the walls 2 and 3 can be utilized.

Any degree of suction high or low can be utilized; and the suction is regulated, by adjusting valves 17 and 18 in the pipes 12 and 13 respectively. The outlet end of the pipe 13 should have a restricted opening at its end so that the moisture as it is removed from the mass between the walls 2 and 3 is vaporized and such a restricted outlet can be assured by properly setting the valve 18, which can be a three-way valve of well known design. The pipe 13 has a short outlet branch pipe 19; the valve 18 is adapted to close the branch 19 and simultaneously restrict the passage through the pipe 13; or close the pipe 13 and open the pipe 19.

The molding device is filled till the whole inner space or cavity between the walls 2 and 3 is occupied with a wet soft mass of concrete or cement, and then the pump or other suction device connected to the lower pipe 13 is operated so that air is drawn in at the top by way of pipe 12. The valve 17 now connects the pipe 12 and header 14; and the cement or concrete begins to dry as soon as suction is applied. But the extracted moisture leaves voids in the concrete; and to make the cement or concrete settle into a dense mass, the voids in it must be eliminated. Therefore the next step is to stop the pump or the like, so that no more suction is exerted in the pipes 12 and 13 and casings 11. The valve 18 is now turned to close the pipe 13 and open the pipe 19, and the valve 17 is turned to close the pipe 12 and open the pipe 20, and air under pressure is admitted by way of the pipe 20 and forced through the header 14 and casings 11 and discharged by way of lower valve 18 and pipe 19. The air is supplied from a reservoir or compression pump coupled to the pipe 20, which branches from the pipe 12 and is connected to the casing of the valve 17; this valve being adapted to close either pipe 12 or 20, while opening the other. The passage of compressed air downward through the casings 11 causes the molding device comprising the walls 2 and 3 and casings 11 to vibrate or quiver, thereby consolidating the confined concrete mass; and by increasing the internal fluid concrete pressure, forcing excess mixing water and entrapped air out through the filtering members of the form. The steps of suction and consolidation by vibration are repeated several times and then the molding device can be removed. Preferably the suction and vibration are performed simultaneously, as set forth below.

In either case, the concrete will now retain its form though not entirely dry, and will harden without further lateral support on the base or pallet 4. The inner surfaces of the mold after removal can be cleaned at once with a hose and used again. Thus a single molding device can produce 12 or more sections every working day, while by the present method such a molding device can be used only once in the same period. Also the product by my method is considerably denser and stronger. During the suction step, moisture passing the valve 18 is trapped in a tank before it can reach the pump connected to the pipe or hose 13.

The filter casings 11 are preferably fitted with fixed baffle plates 21 inside as shown in Figures 4 and 11. These baffle plates divide the interior of each casing 11 into pockets in which the compressed air moves turbulently in many directions; and by the impact of the air under pressure thereon, make the vibration of the mold form with its walls 2 and 3 more efficient and the settling and solidifying of the contents more complete.

The mold form with inner wall 2 and outer wall 3 has the outer wall 3 made of two vertically divided semi-cylindrical sections or halves, joined with the upright edges of the halves abutting, as indicated at 22 in Figures 1, 2, 3 and 7. The halves of the wall 3 are secured together by releasable locking devices illustrated diagrammatically at 23 on the exterior face of the wall 3. Hence the outer wall 3 can be taken off the cast concrete of pipe by unfastening the devices 23 and the inner wall 2 is lifted out of the concrete. The inner wall 2 is divided or split vertically along one side only as indicated at 22 and at the edges are connecting devices indicated at 24 by which the edges, along the slit, which abut when the mold is filled, can be pulled into overlapping position as indicated in Figure 2, to loosen the inner wall 2, so that it can be lifted out easily. The structure of the walls 2 and 3, except for the filters and their connections is not part of my invention.

Sections of concrete or cement conduits are generally shaped with an inside shoulder at one end, and an outside shoulder at the other, to make a so-called "tongue and groove" union between sections of concrete pipe. The ends of the conduits then interengage when joined together, the rim with the outside shoulder on one section fitting into the rim with the inside shoulder of an adjacent section. Hence a ring 25 is put into the mold cavity at the upper end. The ring 25 encircles the inside face of outer wall 3 snugly and is separated by a space 26 from the inner wall 2. This space is filled with concrete. The inner and outer faces of the ring 25 are inclined or tapered to form an outside pipe shoulder. Obviously this ring could be shaped so as to lie close to the inner wall 2 and form an inside shoulder on the end of the cast unit. This ring is pressed down as the concrete settles till it is flush with the top edges of the walls 2 and 3.

At the lower end of the molding device, the wall 2 stands on the base 4, while the outer wall 3 rests on or encircles a ring or pallet 27, separated from the inner wall 2 by a space 28 which is also filled by the contents of the mold. The inside face of the ring slopes downward towards the wall 3 and gives it an inside shoulder and a surrounding rim with bevelled inner face to fit within the rim with a bevelled outer face on the other end of the molded section. The lower ring may also be formed to slant towards the inner wall and form an outside shoulder, if preferred. These features in such pipe molds are well known.

Each grid 6 has a rim or flange 29 (Figures 1 and 6) which projects from one face thereof and fits the opening 5. The lower and upper ends of the casing have nipples 30 for coupling the connecting pipes or hoses 16. Each casing 11 is held on the molding device by a cross bar 31 with openings in its ends to receive threaded studs 32 on the wall 3 so that the bands can be affixed by nuts 33. The rims or flanges 29 of the grids 6 have external shoulders 34 abutting the edges of the openings 5. The curvature of the casings and filters thereon of course conforms to the horizontal curvatures of the wall 3. Detachable couplings for the pipes 12, 14, 13 and 15, to facilitate removal of the mold form, are diagrammatically indicated at 35.

The casings can also be united to make a circular cage 36 by horizontal curved bars 37 and vertical bars 38 made fast to the casing and one another as by welding, instead of a bar 31 for each casing. They are secured to each half of the mold by studs and nuts 39 on the wall 3. See Figure 2. They can thus be attached to each half of the mold more quickly. The cage may thus consist of semi-circular sections to cover the two halves of the wall 3. Ordinary detachable pipe couplings can be used to connect the casings to the headers 14 and 15 and to one another. The studs and nuts are omitted from Figure 1 for convenience and clearness.

As indicated on Figures 1 to 7 inclusive, the casings 11 are mounted so that each opening has its own casing; but the casings may be of larger size and cover two or more openings and mount separate filters over each opening.

Such a construction is presented in Figures 7, 8, 9 and 10. Here the mold has long openings 40 one above another in vertical rows, and side by side, so that fewer openings in each vertical row suffice for the full height of the molding device 1. Each vertical row of openings is covered by a single long vertical channel-shaped casing 41. The portions of the wall 3 separating the openings are shown at 42. The casings have baffle plates therein as shown on Figures 4 and 11.

Each opening 40 has a filter therein consisting of a grid 43 and perforated plate 44 and a sheet of cloth and wire mesh between them as before, in the plane of the opening and surrounded by the edges of the opening. The grid, plate, mesh and cloth between can be prepared as a unitary member with fixed prongs 45 at the side edges of the grid and plate to fit tight against in between the sides of the casings 41. Countersunk bolts 46 are passed through holes in the grids, cloth to engage threaded sockets or nuts 47 welded to the bottoms of the casings 41 to secure the filter members to the casings in correct positions. The casings can be welded or otherwise secured, detachably if preferred, to the outer wall 3. The filter members with the prongs 45 are inserted into the openings 40 from the inside of the outer wall 3, guided into the casings 41 by the prongs 45 and made fast by the bolts 46 screwed into threaded bosses 47 on the casting 41. This construction makes the header pipes 14 and 15 and the vertical pipes 16 from filter to filter unnecessary. The pipes 12 and 13 (Fig. 8) are joined by branches 48 to the top and bottoms respectively of two adjacent casings 41, and the casings 41 are united at top and bottom by horizontal inlet and outlet pipes 49 and 49a which will have detachable couplings at the abutting vertical edges of the wall 3. The outer wall 3 may have external tubular metal reinforcing ribs 50, which also can serve as header pipes 14 and 15.

Figures 11 and 12 show a casing 51 of elongated shape, having coupling nipples 30, at top and bottom. This casing also is adapted to be mounted in an opening through a wall 13 of a mold form, and support through a filter comprising at least a perforated plate and a sheet of cloth or made as above described, over said opening. Inside the casing are baffle plates 52, secured at one end alternately to the opposite sides slanting in reverse directions downward towards the bottom across the casing and tilted alternately from the front of the casing towards the filter, and from the filter towards the closed front of the casing. These baffle plates have their opposite ends separated each from the adjacent plate to mark out a zig-zag path through the casing from top to bottom. With this construction compressed air may be utilized for both suction to extract moisture and to solidify the concrete and the vibration effect of the compressed air is very thorough; thus causing a tortuous and repeatedly deflected flow of air with a resulting vibratory impact action on the baffle plates and on the mold as a whole and this vibration is transmitted to the concrete.

In Figures 13, 14 and 15, a similar casing 51 has a closed front and is attached to the wall 3 of a mold form, with a filter mounted on its inner open side or face over said opening as before; but inside this casing are transverse baffle plates 53 which are secured to the closed front and extend parallel to the top and bottom, but are tilted downward from the front towards the rear where the filter is mounted. Between the baffle plates 53 and the filter are plates 54, extending from side to side of the casing, all parallel to the top and bottom of the casing, each curved transversely in two directions, and disposed on a plane parallel to the filter so that they present two surfaces running across the casing; the upper surface towards the baffle plates 53 being concave and the lower slightly convex. The upper edge of each plate 54 overlaps at the rear the lower edge of the plate 54 immediately above it, and said edges of the plates 54 are separated throughout by a long space, forming transverse elongated slits or nozzles 55. The lower edges of the baffle plates 53 are curved downward as shown at 56 adjacent the nozzles 55 and are separated from the plates 54 by spaces 57. These spaces 57 also form nozzles, as do the spaces 55. When compressed air is admitted to the upper end of the casing, it flows down and is deflected by the plates 53 towards the plates 54. It flows past the edges 56 of the baffle plates and as it issues from the elongated transverse nozzles 57, this air has an aspirating effect on the nozzles 55 at the overlapping edges of the plates 54. Hence a partial vacuum is created and air is drawn out through the filters and carries moisture with it. The air and moisture are discharged through an outlet 58 at the lower end of the casing, and the lower plate 54 is curved toward the outlet 58 to guide the air and moisture thereto. With this casing the compressed air withdraws moisture or excess water from the concrete in the mold form and simultaneously vibrates the form to settle and solidify the mass. Hence the entire treatment is accomplished in a single step of performance.

Figures 16, 17, 18 and 19 show a gang mold consisting partly of rectangular parallel flat plates with their shorter edges upright, for casting concrete or cement floor or roof slabs or planks. The concrete or cement is loaded in at the open tops, the bottoms also being open and the mold is set up on a flat base or bed. The gang mold comprises several pairs of single molds standing side by side, with their longer edges horizontal.

The molds of each pair have between them a double wall comprising adjacent parallel plates 59, close together, with several horizontally alined openings 60 in each plate 59; each opening 60 in each plate 59 being opposite one opening in the adjacent plate 59; the plates 61 on the opposite sides of each pair of molds, including the upright end plates 62 joining the plates 61 being continuous without openings. An air and moisture filter 63 is mounted in each opening; and the space between each pair of filters in adjacent plates 59 is connected by short pipes 16 at the top to an air inlet header 64 and at the bottom to an air and water outlet pipe 65. The headers are coupled to a main inlet pipe 12 and a main outlet pipe 13 respectively. Webs 66 connect the side edges at bottom, top and ends of each two adjacent plates 59, so that the single molds of each pair have a common double walled member with closed ends, top and bottom, and filters in each wall 59; and each mold also has another continuous wall consisting of the plate 61 on its opposite side, with top and bottom open and ends closed. The imperforate walls 61 are also common to adjacent molds of different pairs. Each pair of adjacent walls 59 and their webs 66 can be attached to each other securely, but the plates 61 and 62 are detachable from each other and from the double-walled members so that the plates 61 and 62 and the double-walled members can be lifted at the proper time so as to strip the cast units, and free the mold members for further use.

The filters 63 in the walls 59 serve to pass air and excess moisture from the concrete. The single molds, all open at the bottoms, rest on a base or bed 4, as indicated on Figure 17, and receive the cement or concrete through the open tops. This apparatus is operated to extract excess moisture and consolidate the mass of cement or concrete in the same manner as the other constructions above described and fabricate cast units of great strength and density in a short time. The header pipes (not shown) coupled to the pipes 64 and 65 will have valves 17 and 18 and branches 19 and 20 as before. The double-walled members with the filters and the plates 61 and 62 are detachably secured together, as with the cylindrical molds above set forth, by any suitable releasable means so that they can be readily removed when the excess moisture has been drawn out and the mass of concrete or cement has become sufficiently stable.

The spaces between the filters 63 in this instance also are each preferably equipped with baffle plates 21 indicated on Figure 16 as illustrated at 21 in Figure 4 or Figures 10, 11, 12, 13, 14 and 15. When compressed air is forced through such casings the impact of the air on the baffle plates again gives the quivering or vibrating effect to the mold forms, and eliminates the small voids in the cement or concrete. It is the vibration of the mold and not the pressure of the air that produces this result.

If desired the pipes 12 and 20 for all constructions herein set forth, may be connected to receive steam instead of air. Steam passed at suitable pressure through the filter boxes will draw out moisture and the heat of the steam will help because of its evaporating action on the excess moisture in the mold and its acceleration of the setting of the cement. Steam may also be employed at predetermined pressure to cause the vibration and quivering of the parts of the mold to consolidate the cement and fill the voids therein. The entire process of vibration is thus performed without mechanically actuated moving parts.

If the tops and bottoms of these gang molds are open the slabs will have plain long edges. But tongues and grooves can be formed at these edges if desired. To this end, in the open top of each single mold, bars of suitable cross sectional shape, to produce grooves in one edge of the slab, will be laid in the wet cement or concrete, between the top edges of the double-walled members and the plates 61. These bars will be loose in the molds but imbedded to the level of the concrete or cement, as the mass is vibrated and settled. Also in each single mold at the bottom a pair of bars with a space between them or long plates with grooves will be laid along the lower horizontal edges of the plates 59 and 61. These spaces have a slightly greater width and the same cross section as the bars for the grooves in the top of the molds and will form ribs or tongues along the other long edge of the cast slabs or planks. The bars of course, may be laid to form the grooves at the tops and the tongues along the bottoms of the molds.

Figures 17 and 18 illustrate how the filters 63 are mounted in the members or housings comprising the walls 59. Webs or plates 67 between adjacent plates 59 extend all around the edges of the oppositely located filter openings 60 therein, and the webs 67 between each pair of plates 59 surround an inner frame or casing 68, extending from one plate 59 to the other and filling the opposite filter openings. Each frame 68 carries in the plane of each plate 59 a perforated steel plate 69, over the outer face of which is a full size piece of cloth 70. The edges of the cloth 70 are gripped between the plates 59 and the webs 67. See Figure 18. The cloth 70 is in contact with the cement or concrete and forms a filter with the plate 69. Such a filter may also be constructed as set forth above in Figures 3 and 10. Each frame or casing 68 will be connected to the inlet header pipe 64 or at the top and an outlet header pipe 65 at the bottom; and these will be joined to inlet pipes 12 and outlet pipes 13, respectively, as above stated. When set up, such a gang mold with double walls 59, and intervening walls 61, will have the full construction shown in vertical cross section on Figure 19, with the separate single molds in pairs, each pair having the double-walled member with filter casings between, and the concrete or cement can be poured in at the tops.

Figures 20, 21 and 22 show, mostly in section, another form of double-wall member comprising two adjacent plates 71 united along their sides by webs 72 and at their upper and lower ends by webs 73. Each plate 71 has a vertical series of openings, each opening in one plate being opposite a similar opening in the other. The edges of the matched openings are united by webs 74 to form casings which support filters 71, one in the plane of each plate. These filters may each include a perforated plate with mesh or cloth over them as in Figure 18. The casings communicate with each other at top and bottom through pipes 75; the pipe 75 of the uppermost casing having connection with an inlet pipe 76. An outlet or exhaust pipe 77 with a restricted inlet opening at its lower end runs down through the pipes 75 into the lowermost casing. When this structure is employed it is placed upright between two unperforated plates like the plates 59 of the mold in Figures 16, 17, 18 and 19 but standing on their shorter edges, as many individual plates being joined to make a gang mold as may be needed. The pipes 76 and 77 of each double wall structure are joined as before to headers, as shown at 64 and 65 in Figure 16, coupled to inlet and outlet pipes 12 and 13 having valves 17 and 18 and branches 19 and 20 respectively. This double-walled member is used as before between plates 61 of the same size and similarly placed, but without openings, to form molds with open tops. The molds are closed at the ends by long plates 62.

All the apparatus described above operates from the outside of the mass of concrete under treatment. The same process can be performed with the same results regarding the extraction of excess moisture and the solidifying and acceleration of the hardening of the cement or concrete by eliminating voids by means of apparatus which takes effect within the mass, as illustrated in Figures 23 to 28 inclusive.

In the device shown by Figures 23 and 24 a mold comprising side plates 61 joined by end plates is set up; the open bottom resting on a bed or other flat support 4 and the top being open so that the concrete can be dumped into it. The plates 61 are as far apart and as high as required and as long as necessary in a direction perpendicular to the plane of the sheet of drawings. Inside the mold is an upright casing 78, with openings 79. The casing is covered with cloth fabric 80; which along the perforated wall or sides of the casing having the apertures 79 constitutes a filter. The top of the casing has an inlet nipple 81, to be coupled to a pipe 82 for supplying air under pressure to the inside of the casing 78.

Within the casing are two vertical rows of plates 83, in position for the compressed air to flow in between them. The plates extend from top to bottom of the casing, the upper edges 85 of the plates 83 being bent outward towards the casing 78 and the lower edges 84 in the opposite direction. The edges 84 and 85 of adjacent plates 83 overlap and form elongated nozzles 86, extending parallel across the casing 78. Obviously if the tubular casing 78 is within and surrounded by the concrete, the air under pressure or steam entering at the inlet 81 and flowing downward will create a partial vacuum in the spaces 87 between the members 83 and the sides of the casing 78 and withdraw moisture from the concrete through the cloth 80 and apertures 79 and at the same time a vibratory action will be set up in the casing and be communicated to the concrete, to eliminate the voids and solidify the mass. Each vertical row of plates 83 is rigidly connected to a pair of ribs 88 to unite the plates. The ribs 88 are in the spaces 87 and extend from top to bottom of the casing, making contact along their edges with the opposite sides of the casing 78, but if desired the ribs 88 can be omitted and the plates 83 can be joined rigidly at their opposite ends to the casing 78.

The projections along the edges 84 deflect the air or steam towards the axis of the casing and the fluid is caused to take a tortuous path through the casing. The impact of the fluid on the edges 84 causes the necessary vibration to solidify the cement.

At the center or axis of the casing is an exhaust pipe 89, extending through the upper end of the casing down to a point very near the bottom. In the sides of this pipe at its lower or inner end are recesses 90, which form restricted inlet parts for the air or steam to enter this pipe 89. The bottom edges 84 of the lowermost plates are bent inward towards the pipe 89, leaving openings 86 along the bottom edges of the lowermost plates 83. The upper extremity of the pipe 89 is connected to an exhaust line 91. The air under pressure or steam withdraws excess moisture out through the pipe 89 and vibrates the concrete mass to cause it to settle, at the same time.

This apparatus is useful in the production of hollow cast building units, such as slabs for floors, roofs or walls. Several casings such as shown at 78 can be used in a row, if the cast unit is to be a long one. They are all pulled out of the concrete when the process of extracting water and solidifying the concrete is finished. The setting and hardening of the concrete then take place and the sides 61 and ends of the mold device are then removed.

The plates 83 can have the form shown in Figure 23a for example, which illustrates how such plates would be arranged at the right of the central pipe 89 in Figure 23. Such plates have approximately the outline when viewed edgewise, as shown at 54 in Figures 14 and 15. A similar arrangement of plates is shown in Figure 26, these plates 83 being either secured at their opposite vertical ends to the inside of the casing 78 or being connected by ribs 88 which are attached to the faces which these ribs present, to the casing 78. It is important that these plates or ribs 88 should make contact at their vertical edges with the casing 78, so that the vibration can be transmitted to the casing and the concrete surrounding it.

As shown in Figures 25 and 25a the casing 78a may be round and the plates 83a can be annular or bellshaped, with the upper edge of each member overlapped by the lower edge immediately above it. This construction is fully illustrated in Figure 25a and the annular members 83a can be provided with exterior ribs 88a, which make contact along the outer edges of the casing 78. The upper edges 84a of the member 83a project inward and the lower edges 85a outward, forming annular nozzles 86a, and the operation and effect are the same as before.

As illustrated in Figures 27 and 28 the casing 78b can be enclosed or embedded in the concrete in a horizontal as well as vertical position. In the two figures mentioned a mold is indicated with sides 61 and ends 62 and having an open top and bottom so concrete can be poured into it. The casing is tapered and has openings 79 covered by cloth 80. It is mounted in openings in the ends 62 of the mold form and closed at both extremities. The central inlet pipe 92 has an outlet port 93 at the smaller end of the casing, and this pipe projects at the opposite or larger end of the casing for connection with an air inlet line indicated at 82a. Said opposite end of the casing has an outlet for exhaust line 91 connected thereto. A current of air in line 82a flows through the pipe 92 and port 93 into the casing, creating a partial vacuum in this casing, so that air and moisture are withdrawn through the cloth 80 and apertures 79.

The vacuum is created in the space 87 between the casing 78b and an aspirator sleeve 83b which surrounds the pipe 92. The aspirator member 83b is somewhat similar to the member 83a and has arc-shaped openings between inbent edges 84b and outbent edges 85b, to make aspirator nozzles 86b. At one end the member 83b surrounds the pipe 92 snugly and has a nozzle 94 which delivers to the outlet pipe 91. At its aforesaid end the member 83b has an inturned rim which surrounds the pipe 92 between the adjacent end of the casing and the port 93.

The member 83b may be made up of hollow sections with the rims 84b bent in at one end, and edges 85b bent outward at the other end, and the sections can be contracted somewhat adjacent the outward-bent ends 85b. The member 83b is thus held in position by the pipe 92, and along the outer side extend ribs 88b between it and the casing. The pipe 92 and member 83b can easily be removed by taking off the larger cover 95 and pulling the pipe and aspirator member out through the wider end of the casing 78b. The opposite or smaller end, which can also be fixed on the pipe 92 can be pulled out at the same time, so that the entire casing may be more easily extracted from the concrete or cement afterwards. The device shown in Figures 27 and 28 may of course be used in vertical position.

The outlet pipe 91 may have the internal shape of a Venturi tube where it is connected to the casing 78b.

The aspirator member shown in Figure 23a can be formed by winding spirally a strip or plate of metal with the edges overlapping to form a spiral aspirator nozzle over its entire length.

In the construction shown in Figures 23, 26 and 27, the operation can be carried out by compressed air or steam to create suction and produce vibration; the fluid passing into the perforated casing at one end, going all the way to the opposite end and then traveling back, to the expelled at the end where it entered. The compressed air striking the edges of the aspirator nozzles effects a vibration and a settling of the cement, and the suction in the space 87 between the aspirator and the casing removes the moisture. The vibration is due to the impact of the air or steam upon the inward-bent edges of the aspirator nozzles. The operation can also be carried out by suction on the outlet pipe 91 and controlling the admission of air by means of a valve adjacent the inlet pipe 82 or 82a; and using steam or compressed air to bring about vibration after suction.

Figure 29 indicates how the aspirator sections in the form of plates shown in Figures 23 and 26 can be at their ends mounted on trunnions 96, the trunnions being pivotally supported in the casing 78. Arms attached to the trunnions are pivotally connected to a rod 97, which is accessible from the exterior of the casing. Thus the plates can be turned so that they may contact with one another, to close the aspirator nozzles, and the lowermost of these plates being rotated at the same time so that they almost touch the bottom or inner ends of the casing. With such construction an efficient vibratory effect can be obtained after the suction is finished, and the device then serves as a vibrator alone.

In Figures 30 and 31 a casing 78c is shown which can be collapsed so that it can be more easily pulled out. This casing is cylindrical, but is split, as shown at 98, where it has overlapping edges and inclined shoulders. A tube 92 passes through the end of the casing as before, and may carry an aspirator member 83b, as shown in Figure 27. The ends of this casing are closed by covers 99, each having a rim 100 that fits inside the casing for the greater part of its length but is separated from the casing by a space 101 adjacent the split 98. Each rim carries a lug 102 and one part of the casing carries a lug 106 adjacent the split 98. In the lugs 102 is a rotatable rod 103 having an arm 104 adjacent each cover 99 pinned to a link 105, which is also pinned to one lug 106 on the inside of the casing near the split 98. The rod passes through the opposite end of the casing and carries on its outer end a crank 107. Hence by turning the rod a portion of the casing is pulled against the section of the rims that are separated from the edges of the end covers for the casing and thus the casing can be contracted or collapsed when it is to be pulled out. The cover 99 which is embedded in the concrete may be so shaped that the portion of the outer edge thereof adjacent the split portion of the casing is not flush with the surface of the casing, but is overlapped slightly along this edge by the casing 78c. Thus this end is somewhat smaller than the full diameter of the casing, and when the casing is contacted slightly by operating the rod 103 said cover will not be in full contact along its whole edge with the concrete, and thus the withdrawal of the entire casing from the concrete is thus facilitated.

In all the above described operations, the extraction of excess moisture from the cement or concrete is accompanied by the evacuation of air contained in the mass. Such air is generally designed as "occluded" air and if retained would cause many of the voids that lower the density and strength of the cement when the hardening process is finished. The removal of the occluded air also facilitates the solidification of the cement or concrete during vibration of the mass, which is an important step in the practice of my invention.

Having described my invention, what I believe to be new is:

1. Apparatus for treating a mass of wet cement to facilitate the hardening and solidifying of said mass, comprising a casing having a perforated wall presented to said mass, and means for transmitting mobile fluid through said casing to withdraw excess moisture from the cement through said wall, said casing having parts arranged diagonally therein to receive the impact of said fluid in motion and cause vibration of the casing and settling of the cement to eliminate voids therein.

2. Apparatus for treating a mass of wet cement to facilitate the hardening and solidifying of said mass, comprising a casing having a perforated wall presented to said mass, and means for transmitting mobile fluid through said casing to withdraw excess moisture from the cement through said wall, said casing having parts arranged diagonally therein to receive the impact of said fluid in motion and cause vibration of the casing and settling of the cement to eliminate voids therein, said casing being elongated and tubular in form to permit it to be embedded in said mass.

3. Apparatus for treating a mass of wet concrete to facilitate the hardening and solidifying of the mass, comprising a molding device with openings in its wall, casings attached to said device over said openings, a filter member in each opening, baffle plates in each casing, and connections for transmitting mobile fluid through each casing, said plates forming a tortuous path for the fluid through each casing to receive the impact of said fluid.

4. Apparatus for treating a mass of wet concrete to facilitate the hardening and solidifying of the mass, comprising a molding device with openings in its wall, casings attached to said device over said openings, a filter member in each opening, baffle plates in each casing, and connections for transmitting mobile fluid through each casing, said plates forming a tortuous path for the fluid through each casing to receive the impact of said fluid, said filter members each comprising a plate having openings and prongs on said plates to fit inside said casings.

5. Apparatus for treating a mass of wet concrete to facilitate the hardening and solidifying of the mass, comprising a molding device with openings in its wall, casings attached to said device over said openings, a filter member in each opening, baffle plates in each casing, and connections for transmitting mobile fluid through each casing, said plates forming a tortuous path for the fluid through each casing to receive the impact of said fluid, said connections being coupled to the upper and lower ends of said casings, the baffle plates extending across the casings from side to side and being tilted alternately towards and away from said filter members.

6. Apparatus for treating a mass of wet concrete to facilitate the hardening and solidifying of the mass, comprising a molding device with openings in its wall, casings attached to said device over said openings, a filter member in each opening, baffle plates in each casing, and connections for transmitting mobile fluid through each casing, said plates forming a tortuous path for the fluid through each casing to receive the impact of said fluid, said connections being coupled to the upper and lower ends of said casings, the casings being open at their inner faces adjacent said filters and having closed outer faces, the baffle plates extending across the casings and being inclined from the closed outer faces toward said filter members, and a series of upright transverse plates in the casings between the filter members, and the baffle plates, said upright plates having the lower edge of each overlapping the upper edge of the upright plate below it on the sides of said plates towards said baffle plates.

7. Apparatus for producing cast concrete structures comprising a cylindrical mold form with inner and outer walls, one of said walls having openings, filter members over said openings, closed casings over said filter members, and connections for transmitting mobile fluid through the casings, past said members, said casings having baffle plates therein to receive the impact of said fluid.

8. Apparatus for producing cast concrete structures comprising a cylindrical mold form with inner and outer walls, one of said walls having openings, filter members over said openings, closed casings over said filter members, and connections for transmitting mobile fluid through the casings, past said members, said casings having baffle plates therein to receive the impact of said fluid, each opening having a separate casing over the filter member in said opening.

9. Apparatus for producing cast concrete structures comprising a cylindrical mold form with inner and outer walls, one of said walls having openings, filter members over said openings, closed casings over said filter members, and connections for transmitting mobile fluid through the casings, past said members, said casings having baffle plates therein to receive the impact of said fluid, said openings being in rows, each of which has an elongated casing secured to the wall having said openings.

10. Apparatus for producing cast concrete structures comprising a cylindrical mold form with inner and outer walls, one of said walls having openings, filter members over said openings, closed casings over said filter members, and connections for transmitting mobile fluid through the casings, past said members, said casings having baffle plates therein to receive the impact of said fluid, the casings having upright and horizontal bars joined to said device to hold the casings in position.

11. An implement for treating cement to accelerate drying and hardening and eliminate voids therein, said implement being tubular with perforations in its outer wall and porous material over said perforations, a conduit extending along the inside of the casing for admitting power fluid passing through one end of the casing, said conduit having nozzles along its length pointing toward the same end of the casing, and an outlet conduit within said first-named conduit, with a restricted inlet opening adjacent the opposite end of the casing.

12. An implement for treating cement to accelerate drying and hardening and eliminate voids therein, said implement being tubular with perforations in its outer wall and porous material over said perforations, a conduit extending along the inside of the casing for admitting power fluid passing through one end of the casing, said conduit having nozzles along its length pointing toward the same end of the casing, and an outlet conduit within said first-named conduit, with a restricted inlet opening adjacent the opposite end of the casing, said inlet conduit being rectangular in cross section, and ribs between the inlet conduit and the wall of said casing.

13. An implement for treating cement to accelerate drying and hardening and eliminate voids therein, said implement being tubular with perforations in its outer wall and porous material over said perforations, a conduit extending along the inside of the casing for admitting power fluid passing through one end of the casing, said conduit having nozzles along its length pointing toward the same end of the casing, and an outlet conduit within said first-named conduit, with a restricted inlet opening adjacent the opposite end of the casing, said inlet conduit being round in cross section and said nozzles annular in shape.

14. An implement for treating cement to accelerate drying and hardening and eliminate voids therein, said implement being tubular with perforations in its outer wall and porous material over said perforations, a conduit extending along the inside of the casing for admitting power fluid passing through one end of the casing, said conduit having nozzles along its length pointing toward the same end of the casing, and an outlet conduit within said first-named conduit, with a restricted inlet opening adjacent the opposite end of the casing, said inlet conduit comprising curved plates extending from side to side in the casing, the edges of each plate overlapping to form nozzles pointing towards said opposite end of the casing.

References Cited in the file of this patent

UNITED STATES PATENTS

| | | |
|---|---|---|
| 1,989,409 | Gordon | Jan. 29, 1935 |
| 2,116,557 | Billner | May 10, 1938 |
| 2,196,874 | Ruegg | Apr. 9, 1940 |
| 2,501,158 | Chilcott | Mar. 21, 1950 |
| 2,529,500 | Johnson | Nov. 14, 1950 |
| 2,638,655 | Creskoff | May 19, 1953 |
| 2,650,412 | Dubbs | Sept. 1, 1953 |